United States Patent Office.

PAUL A. OLIVER, OF NEW YORK, N. Y.

Letters Patent No. 80,004, dated July 14, 1868.

---

IMPROVED POWDER FOR BLASTING AND OTHER PURPOSES.

---

The Schedule referred to in these Letters Patent and making part of the same.

---

TO ALL WHOM IT MAY CONCERN:

Be it known that I, PAUL A. OLIVER, of 111 Broadway, in the city, county, and State of New York, have invented a new and useful Improvement in Gunpowder; and I do hereby declare that the following is a full, clear, and exact description thereof, which will enable others skilled in the art to make and use the same.

This invention relates to a new and improved gunpowder, the advantages of which are, that it can be made much more rapidly, with perfect safety, cheaper and stronger than the ordinary gunpowder now manufactured.

My improved powder, such as is designed for blasting, is made from common peat instead of charcoal, and freshly dug peat may be used. The other ingredients are saltpetre, sulphur, and chlorate of potash, which are mixed in proportions according to the kind of powder to be used, and the strength required.

My improved blasting-powder is made as follows:

The saltpetre and chlorate of potash in a pulverized state are put in a drum or box, provided internally with toothed shafts, or any suitable means for mixing the ingredients above named.

The peat and sulphur are also placed in a similar drum or box, and the ingredients in the two drums or boxes are mixed for about three (3) minutes.

The drum containing the saltpetre and chlorate of potash has about eight (8) pounds of water placed in it, and about ten (10) pounds of water are added to the peat and sulphur. The substances in the two drums are then agitated and mixed, and incorporated with the water for about two (2) minutes. The peat and sulphur are then taken from the drum which contains them, and placed in the drum containing the saltpetre and chlorate of potash.

All the ingredients being then combined, they are all mixed for about three (3) minutes, and the mass is ready for the powder-machine, which incorporates the several ingredients intimately together, and which machine forms the subject of a separate application for Letters Patent.

My improved gunpowder is made of peat, saltpetre, and sulphur, in different proportions, according to the kind of powder required, whether musket or sporting-powder.

The peat, saltpetre, and sulphur are placed in a drum and mixed for about four (4) minutes, and thoroughly combined. About eight (8) pounds of water are then added to the mixture, and the mass again mixed for about four minutes more. It is then passed through the mill or machine, and treated in the same manner as the blasting-powder. When the powder comes out of the mill or machine it is dried, and is then ready for use.

In place of saltpetre I also use nitrate of soda, which makes a much cheaper powder, being less than half the value of saltpetre in market.

The nitrate of soda is very liable to become wet when exposed to the air, and in order to avoid this, I incorporate a small quantity of bees-wax or tallow with it.

The use of peat is a very important alteration, inasmuch as it gives the powder more strength than can be obtained by using charcoal in place of it. Repeated trials have proved to me that an inexplosive powder, made of charcoal, has not near the strength as when the same proportion of peat is used.

A charcoal powder becomes explosive after very little manipulation, and even then the same force cannot be obtained as when made of the same proportion of peat.

A charcoal powder cannot be made with safety, or without danger of explosion, as the frequent accidents on this head have substantially proved.

The peat has not only the tendency to make the powder inexplosive, but gives also additional strength.

Charcoal is an artificial product, and much more expensive. Peat is the result of a natural and gradual process of nature, and is not alone of great importance on account of its making a stronger powder as a substitute for charcoal, but it is always ready for use, very abundant everywhere, and very much cheaper.

The use of peat is an important feature, as it is found all over the country in great abundance, and is very cheap, and may be used directly or when freshly dug, no previous preparation being required. The powder in itself is entirely inexplosive when exposed to the air, but stronger than the ordinary powder when confined. It makes, when burned, scarcely any smoke, can be immersed in water, and then redried without losing its force.

In guns the recoil is very slight, and the smoke is much less than with ordinary powder. It also absorbs less moisture than ordinary powder, and in its manufacture may be dried in half the time of ordinary powder.

Having thus described my invention, what I claim as new, and desire to secure by Letters Patent, is—

The use of peat in the manufacture of gun and blasting-powder, substantially as set forth.

I also claim, as an improved article of manufacture, the powder made substantially as herein described.

The above specification of my invention signed by me, this 21st day of May, 1868.

PAUL A. OLIVER.

Witnesses:
    FRANK BLOCKLEY,
    ALEX. F. ROBERTS.